United States Patent
Lyu et al.

(10) Patent No.: US 8,502,873 B2
(45) Date of Patent: Aug. 6, 2013

(54) METHOD FOR DETERMINING CLEAR IMAGE USING AN IMAGE PICKUP DEVICE

(75) Inventors: Szu-Hao Lyu, Taipei (TW); Kuang-Che Chen, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 298 days.

(21) Appl. No.: 12/848,477

(22) Filed: Aug. 2, 2010

(65) Prior Publication Data
US 2011/0234816 A1    Sep. 29, 2011

(30) Foreign Application Priority Data
Mar. 26, 2010 (TW) ................. 99109068 A

(51) Int. Cl.
*H04N 5/228* (2006.01)

(52) U.S. Cl.
USPC ... 348/207.1; 348/171; 348/172; 348/208.12; 348/583

(58) Field of Classification Search
USPC .............. 348/583, 208.12; 382/171, 172
See application file for complete search history.

(56) References Cited

U.S. PATENT DOCUMENTS

| | | | | |
|---|---|---|---|---|
| 5,953,112 A * | 9/1999 | Rosow et al. | ................. | 356/73.1 |
| 2003/0071908 A1* | 4/2003 | Sannoh et al. | ................. | 348/345 |
| 2004/0252195 A1* | 12/2004 | Lu et al. | ................. | 348/188 |
| 2007/0052840 A1* | 3/2007 | Okuno | ................. | 348/364 |
| 2009/0103794 A1* | 4/2009 | Sathyanarayana | ............. | 382/131 |
| 2009/0207276 A1* | 8/2009 | Kawasaki | ................. | 348/229.1 |
| 2010/0040285 A1* | 2/2010 | Csurka et al. | ................. | 382/170 |
| 2010/0177303 A1* | 7/2010 | Masuda et al. | ............. | 356/124.5 |
| 2011/0157376 A1* | 6/2011 | Lyu et al. | ................. | 348/207.11 |
| 2011/0157390 A1* | 6/2011 | Wu et al. | ................. | 348/222.1 |

* cited by examiner

*Primary Examiner* — Roberto Velez
*Assistant Examiner* — Abdelaaziz Tissire
(74) *Attorney, Agent, or Firm* — Kirton McConkie; Evan R. Witt

(57) ABSTRACT

The present invention discloses a method for image pickup and an image pickup device using the same. The image pickup device includes a lens, an image-processing program, and a user interface. The lens is utilized to obtain a main image by shooting an object. The image-processing program divides the main image into a plurality of sub-image blocks, computes the resolution of every sub-image block, and compares each resolution with a threshold. The user interface displays the compared result of each sub-image block to indicate if the lens and the object are parallel.

11 Claims, 5 Drawing Sheets

METHOD FOR DETERMINING CLEAR IMAGE USING AN IMAGE PICKUP DEVICE

FIELD OF THE INVENTION

The present invention is an image pickup method and an image pickup device adopting the same.

BACKGROUND OF THE INVENTION

In virtue of technology rapid development, PC and its peripheral apparatus are popularized for a variety of applications. In which, the image pickup device, such as a web camera (webcam) or a Digital Camera (digicam) are generally utilized with desktop PC or laptop PC to facilitate people's daily life. For instance, for further contacting the customers or the business partners after a certain business conference, it is better to file their business cards to effectively keep the communication information. To execute data filing and recognition, the image pickup device disposed within the laptop PC is always used to capture the images of the business cards to digitize the information thereon. In the same way, the image pickup device also can be utilized to capture the other images information on, such as picture, photo, credit card, debit card, identification (ID), envelop, post card, ticket, notepaper, Post-in note, label, etc. . . . for further applications.

At present, almost every prevailing webcam in the market equips with an auto focusing lens having an auto focusing function, enables it to capture a clear and sharpness image.

However, in the prior art, the auto focusing control adopts an edge detection mode to distinguish whether the edge of the document image is inside a focus area, and analyzes the resolution of the document image (such as by employing modulation transfer function to get a value) to determine if the image is in focus. That is, the prior art utilizes a varying focus, which is appeared during a process of focusing the lens on the document, to calculate the resolution of the document image inside the focus area, and try to focus on a certain location in document to get the highest resolution.

However, it is generally hard to shoot the document to capture a clear image using the prior art image pickup device, because the document is not easy to be disposed well for shooing. In practical, when the user captures the content on the held document by shooting, the image pickup device will automatically locate and focus on a location having the highest resolution in the document. While, the drawback in this operation is that the user is unable to know if the held document and the lens of the image pickup device are parallel to each other. It implies that the captured image is probably part clear, however, part blurred due to defocus as the document is not parallel with the lens of the device.

SUMMARY OF THE INVENTION

The purpose of the present invention is to provide an image pickup method, especially a method of indicating user if the lens of the image pickup device is parallel with the shot object.

Another purpose of the present invention is to provide an image pickup device to indicate user if the lens of the device is parallel with the shot object.

In one preferred embodiment, the present invention provides a method to indicate the user if the lens of the image pickup device is parallel with the shot object, including: shooting an object to get a main image; dividing the main image into a plurality of sub-image blocks; computing a resolution for every sub-image block; comparing the resolution of each sub-image block with a threshold, and displaying on every sub-image block a compared result of the resolution to the threshold.

In one preferred embodiment, the compared result is revealed by a color difference or a color tone.

In one preferred embodiment, the resolution is obtained by Modulation Transfer Function (MTF) calculation.

In another preferred embodiment, the present invention also provides an image pickup device connected to a computer having a video program to control image shooting, including a lens for shooting an object to get a main image; an image processing program installed in the computer to divide the main image into a plurality of sub-image blocks, calculate a resolution for each sub-image block, and compare the resolution with a threshold; and a user interface showing a compared result of the resolution to the threshold for every sub-image block to indicate a user if the lens is parallel with the object.

In one preferred embodiment, the compared result is revealed by a color difference or a color tone.

In one preferred embodiment, the resolution is obtained by Modulation Transfer Function (MTF) calculation.

In another preferred embodiment, the image pickup device is a webcam.

In another preferred embodiment, the present invention also provides an image pickup method, including, shooting an object to get a main image; dividing the main image into a plurality of sub-image blocks; computing a resolution for every sub-image block; comparing the resolution of each sub-image block with a threshold, and displaying on every one of the sub-image blocks the compared result of the sub-image block's resolution to the threshold, and if the compared results on any two of the sub-image blocks are identical, then picks up automatically the main image.

In one preferred embodiment, the compared result is revealed by a color difference or a color tone.

In one preferred embodiment, the resolution is obtained by Modulation Transfer Function (MTF) calculation.

DETAILED DESCRIPTION OF THE PREFERRED EMBODIMENT

Figure 1:
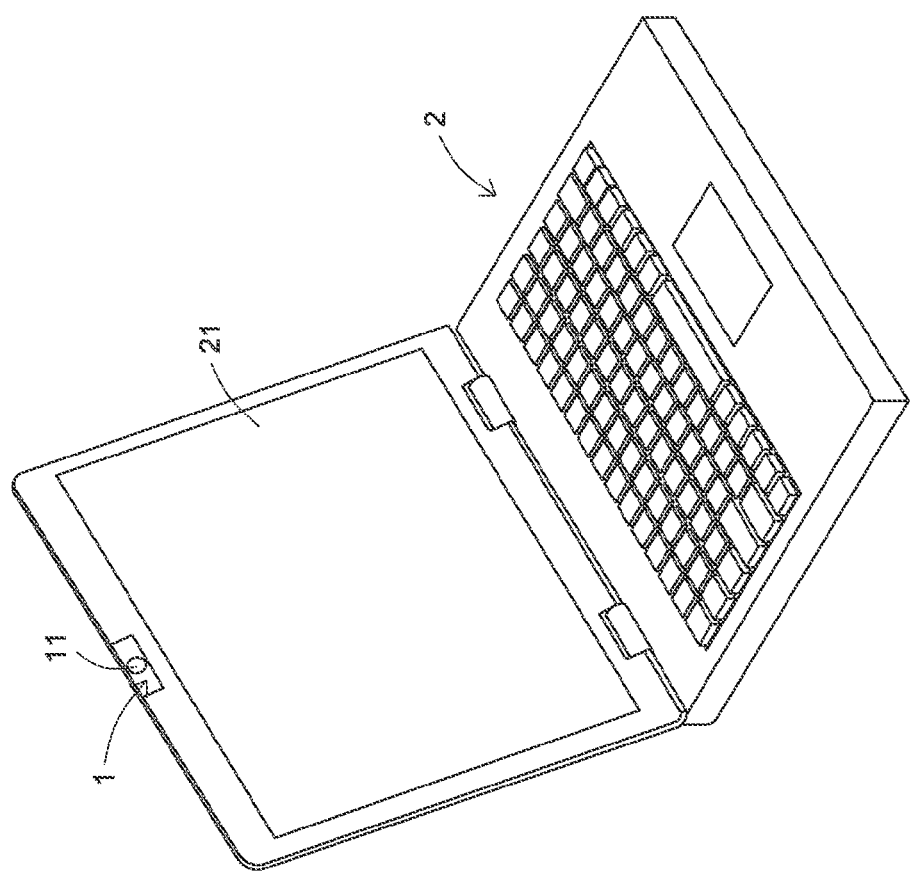
FIG. 1 is an application schematic diagram showing a preferred embodiment of an image pickup device of the present invention.
Figure 2:
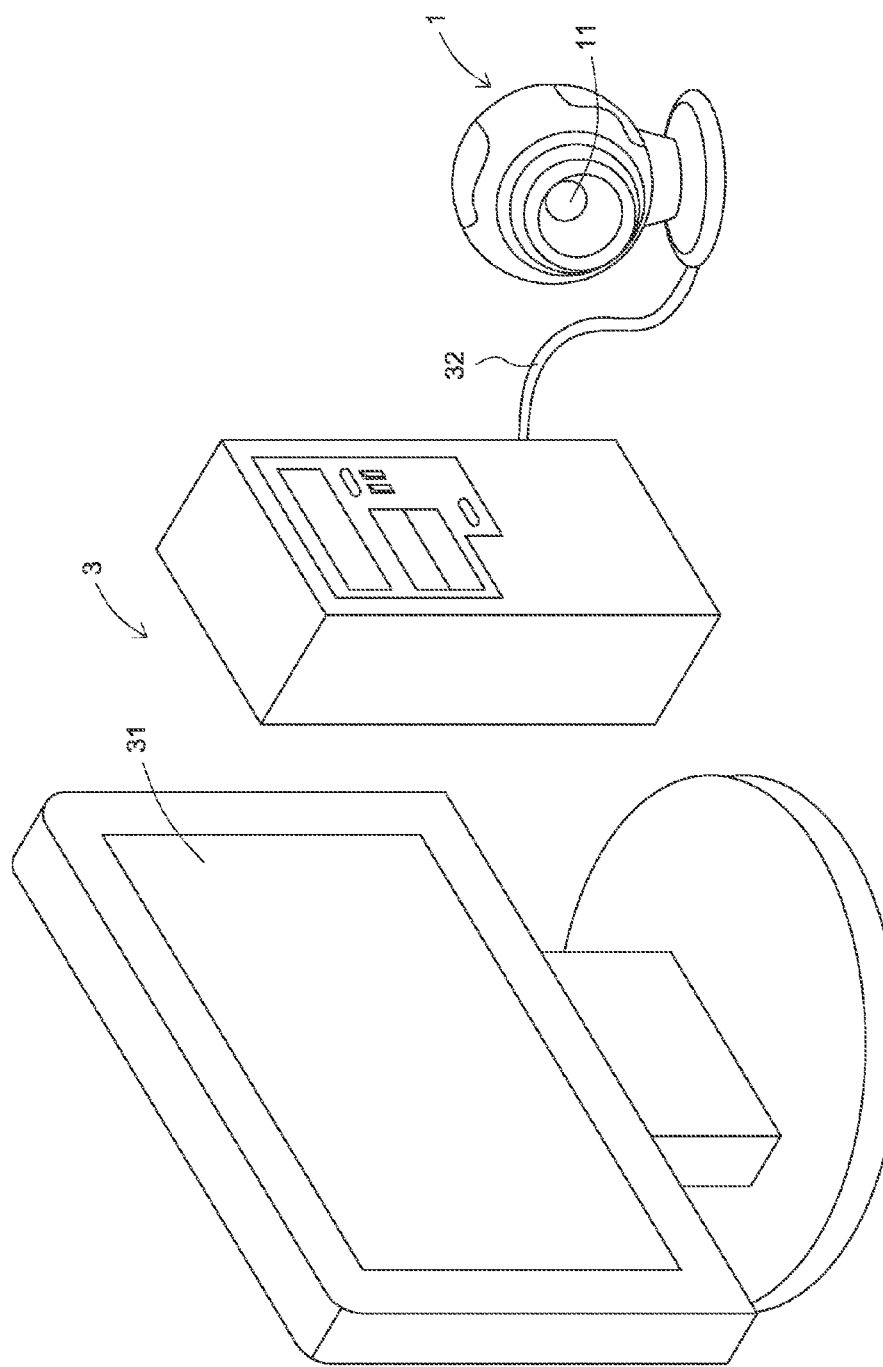
FIG. 2 is an application schematic diagram showing another preferred embodiment of the image pickup device of the present invention.
Figure 5:
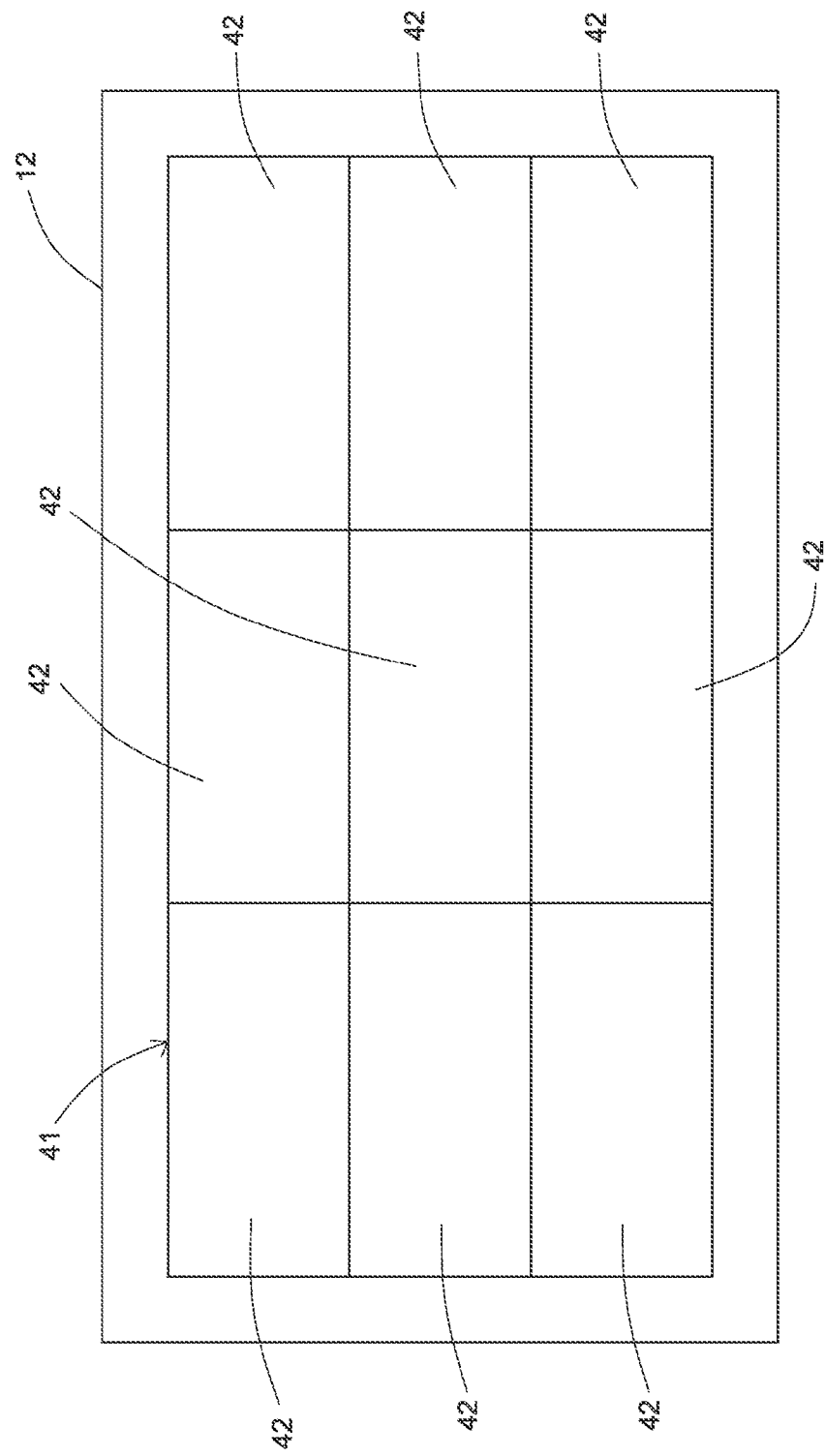
FIG. 5 shows a preferred embodiment of a user interface of the image pickup device of the present invention.

Please refer to FIGS. 1 & 2. FIG. 1 is an application schematic diagram showing a preferred embodiment of an image pickup device of the present invention, and FIG. 2 is an application schematic diagram depicting another preferred embodiment of the image pickup device of the present invention. The preferred embodiment of the image pickup device 1 is a webcam, which could be integrated into the interior of the upper portion of a screen 21 of a laptop PC 2 (as shown in FIG. 1) or exteriorly connected to a desktop PC 3 via a universal serial bus (USB) 32 (as shown in FIG. 2). The image pickup device 1 includes a lens 11 for shooting object, a user interface 12 (as shown in FIG. 5) to guide the user to operate the device, and a processing program installed in the laptop PC 2 or the desktop PC 3 for image processing. In which, the laptop PC 2 or the desktop PC 3 contains a video program to control the image pickup device 1. That is, as the video program is running, the image pickup device 1 proceeds to pick up the image and the processing program processes the image shot by the lens 11, then the processed result is output through the user interface 12, as shown in FIG. 5. In addition, for user's convenience, the preferred embodiment of the user interface 12 is displayed on the screen 21 of the laptop PC 2 or on the screen 31 of the desktop PC 3. Certainly others electronic display equipments also could be connected to the laptop PC 2 or the PC 3 to display the user interface 12.

Figure 3:
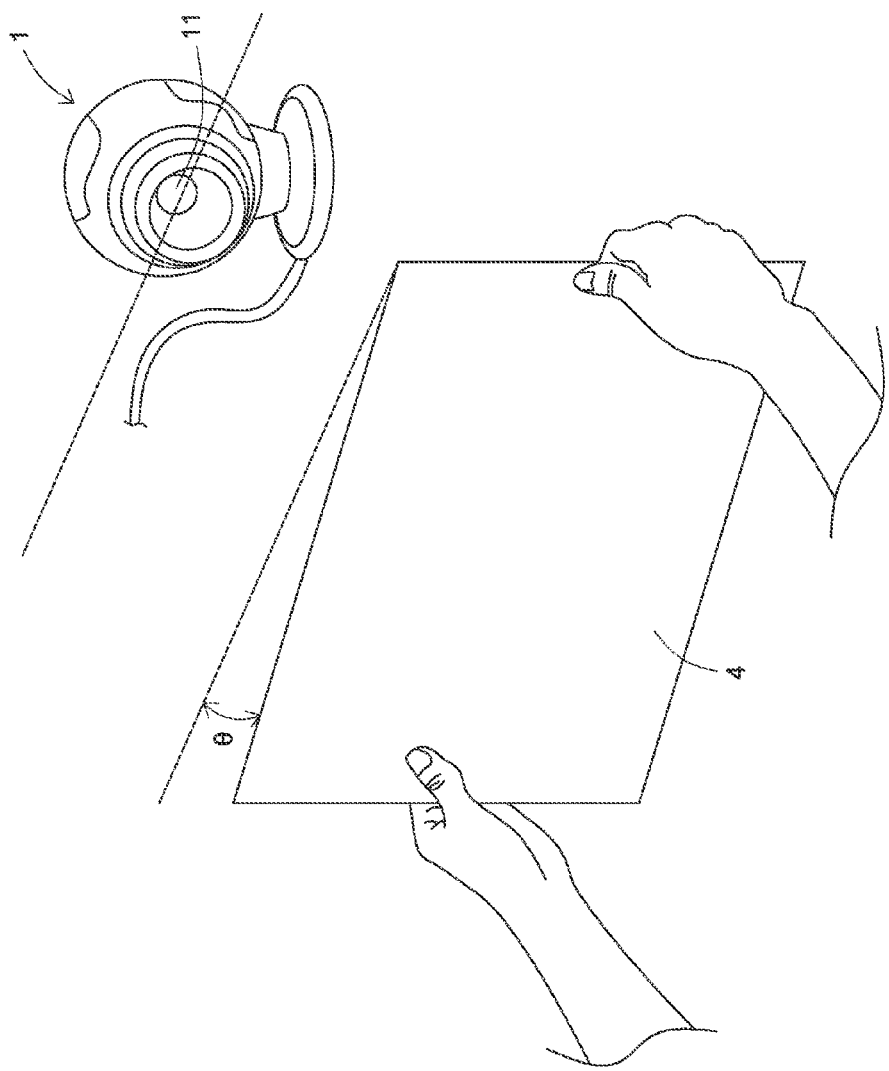
FIG. 3 is a schematic diagram showing the image pickup device in shooting an object and picking up the image.

Please refer to FIG. 3, which is a schematic diagram showing the image pickup device in shooting the object and picking up the image. FIG. 3 illustrates a sheet of document 4 as a shot object, and of course this shot object is not limited to any specified object as mentioned. When using the image pickup device 1 to shoot the document 4, user exposes the document 4 to the lens 11, yet he/she is unable to realize whether the orientation of the hand held document 4 is parallel with the lens 11. And, as shown in FIG. 3, a tilt angle θ appears, if the document 4 and the lens 11 are not parallel to each other, thus a part of the image of the document 4 might be focused and clear, however the other part is defocused and blurred.

To improve the drawbacks mentioned above, the purpose of the present invention is to indicate the user to realize whether the lens 11 of the image pickup device 1 is parallel with the document 4, and the solution is disclosed in detail as follows.

Figure 4:
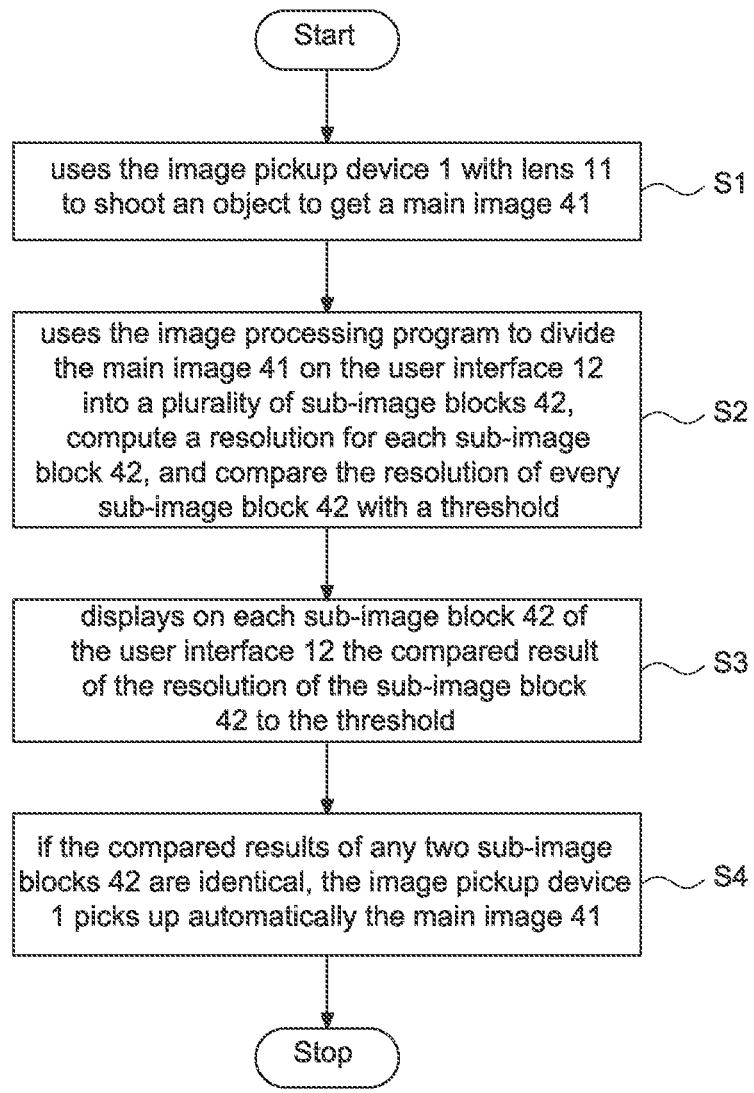
FIG. 4 is a flow chart showing a preferred image pickup method of the present invention.

Please refer to FIGS. 4 and 5. FIG. 4 is a flow chart describing a preferred image pickup method of the present invention, this method also indicates user if the lens of the image pickup device is parallel with the shot object. And, FIG. 5 shows a preferred embodiment of a user interface of the image pickup device of the present invention.

Step S1 uses the image pickup device 1 with lens 11 to shoot an object (the document 4 shown in FIG. 3) to get a main image 41 and output the main image 41 through a user interface 12;

Step S2 uses the image processing program to divide the main image 41 on the user interface 12 into a plurality of sub-image blocks 42, compute a resolution for each sub-image block 42, and compare the resolution of every sub-image block 42 with a threshold;

Step S3 displays on each sub-image block 42 of the user interface 12 the compared result of the resolution of the sub-image block 42 to the threshold. In the preferred embodiment of the present invention, the comparison result is revealed by the color difference, that is, if the resolution of the sub-image block 42 is lower than the threshold, the sub-image block 42 is appeared in the first color, whereas if the resolution of the sub-image block 42 is higher than the threshold, the sub-image block 42 is appeared in the second color. In addition, the other method of revealing the comparison result, such as by color tone is also available. It is emphasized that, the resolution of each sub-image block 42 is obtained by the Modulation Transfer Function (MTF) calculation, the resolution is called in this application field as a MTF value. When the MTF value gets higher, the dark-light contrast is increases, indicates the lens is focusing and the shot image is clear, whereas if the MTF value gets lower, the image dark-light contrast reduces, indicates the lens is defocusing and the image is obscure. The description above should be known to one skilled in the art, and no more of reiteration hereinafter. That is, the image pickup method of the present invention is to compare a specified threshold with the MTF value for each sub-image block 42, and if the MTF value of a certain sub-image block 42 is larger than the threshold, then the sub-image block 42 is focused and the shot image thereof is clear. On the other side, it is not confined to just calculate MTF to obtain the resolution value; any other methods able to calculate the resolution are under the scope of present invention.

Step S4, if the compared results of any two sub-image blocks 42 are identical, the image pickup device 1 picks up automatically the main image 41. In detail, when the resolution of every sub-image block 42 is higher than the threshold, all the sub-image blocks 42 are displayed in a second color to indicate that the shot object is parallel with the lens 11 of the image pickup device 1, and clear images are captured on every sub-image block 42, respectively. Then, the user could pick up the main image 41 by manually pressing the button of the Laptop PC 2 or the Desktop PC 3.

The following description explains how any two sub-image blocks 42 can get the same compared result. Take FIG. 3 as an instance, a tilt angle θ appears as the document 4 held by the user is not parallel with the lens 11, then a part of the sub-image blocks 42 is displayed in a first color and the other parts of the sub-image blocks 42 of the user interface 12 displayed in the second color. The user can adjust the orientation of the held document 4 to reduce the tilt angle θ according to the indication of the user interface 12, to parallel the document 4 with the lens 11 to display all the sub-image blocks 42 in the second color. When the document 4 is parallel with lens 11 the image pickup device 1 picks up automatically the image of document 4. Thereby a clear image is captured assuredly on every region of the main image 41, and the puzzle of unable to realize the parallelism relation between the document 4 and the lens 11 during image capturing is effectively resolved.

While the present invention has been described in particular embodiments, it should be appreciated that the present invention should not be construed as limited by such embodiments, but rather construed according to the following claims.

What is claimed is:

1. A method of determining if a lens of an image pickup device and an object are parallel, including:
    shooting the object to get a main image;
    dividing the main image into a plurality of sub-image blocks;
    computing a resolution for every one of the sub-image blocks;
    comparing the resolution of each one of the sub-image blocks with a threshold to obtain a compared resolution result;
    assigning a color or color tone to the compared resolution result of each sub-image block; and
    displaying the color or color tone of compared resolution result of each sub-image block with the threshold to determine whether the lens of the image pickup device is parallel with the object.

2. The method as claimed in claim 1, wherein the resolution is obtained by Modulation Transfer Function (MTF) calculation.

3. An image pickup device connected to a computer having a video program, and is controlled thereby for image shooting, comprising:
    a lens for shooting an object to get a main image;
    an image processing program installed in the computer which divides the main image into a plurality of sub-image blocks, calculates a resolution for every one of the sub-image blocks, compares the resolution with a threshold to obtain a compared resolution result, and assigns a color or color tone to the compared resolution result of each sub-image block; and a user interface showing the color or color tone of compared resolution result of the resolution to the threshold for every one of the sub-image blocks to indicate to the user if the lens is parallel with the object.

4. The image pickup device as claimed in claim 3, wherein the resolution is obtained by Modulation Transfer Function (MTF) calculation.

5. The image pickup device as claimed in claim 3 is a web camera (webcam).

6. An image pickup method including:
shooting an object to get a main image;
dividing the main image into a plurality of sub-image blocks;
computing a resolution for every one of the sub-image blocks;
comparing the resolution of each one of the sub-image blocks with a threshold to obtain a compared resolution result;

assigning a color or color tone to the compared resolution result of each sub-image block;
displaying the color or color tone of compared resolution result of each sub-image block with the threshold to determine whether the lens of the image pickup device is parallel with the object; and
if the compared resolution results on any two of the sub-image blocks are identical, picking up automatically the main image.

7. The image pickup method as claimed in claim 6, wherein the resolution is obtained by Modulation Transfer Function (MTF) calculation.

8. The method as claimed in claim 1, wherein the object is a document.

9. The method as claimed in claim 1, further comprising picking up automatically the main image if the lens of the object is parallel with the image pickup device.

10. The image pickup device as claimed in claim 3, wherein the object is a document.

11. The image pickup method as claimed in claim 6 wherein the object is a document.

* * * * *